US011205274B2

(12) United States Patent
Gao et al.

(10) Patent No.: US 11,205,274 B2
(45) Date of Patent: Dec. 21, 2021

(54) HIGH-PERFORMANCE VISUAL OBJECT TRACKING FOR EMBEDDED VISION SYSTEMS

(71) Applicant: AltumView Systems Inc., Burnaby (CA)

(72) Inventors: Yu Gao, North Vancouver (CA); Xing Wang, Burnaby (CA); Eric Honsch, New Westminster (CA); Rui Ma, Burnaby (CA); Chao Shen, Richmond (CA); Minghua Chen, Coquitlam (CA); Ye Lu, Coquitlam (CA); Jie Liang, Coquitlam (CA); Jianbing Wu, Coquitlam (CA)

(73) Assignee: AltumView Systems Inc., Burnaby (CA)

( * ) Notice: Subject to any disclaimer, the term of this patent is extended or adjusted under 35 U.S.C. 154(b) by 0 days.

(21) Appl. No.: 15/943,725

(22) Filed: Apr. 3, 2018

(65) Prior Publication Data

US 2019/0304105 A1    Oct. 3, 2019

(51) Int. Cl.
| | | |
|---|---|---|
| *G06K 9/62* | (2006.01) |
| *G06K 9/46* | (2006.01) |
| *G06T 7/262* | (2017.01) |
| *B64C 39/02* | (2006.01) |
| *G06K 9/32* | (2006.01) |

(52) U.S. Cl.
CPC ............ *G06T 7/262* (2017.01); *B64C 39/024* (2013.01); *G06K 9/3241* (2013.01); *B64C 2201/127* (2013.01); *G06T 2207/20056* (2013.01)

(58) Field of Classification Search
CPC .... G06K 9/3241; G06K 9/00; G06K 9/00805; G06T 7/254; G06T 7/262; G06T 2207/20056; G05D 1/101; H04N 5/145; B64C 39/024; B64C 2201/127
USPC .......................................... 382/103; 348/169
See application file for complete search history.

(56) References Cited

U.S. PATENT DOCUMENTS

| | | | | |
|---|---|---|---|---|
| 5,557,323 A | * | 9/1996 | Kajiwara ................ | G01S 11/12 348/140 |
| 6,545,706 B1 | * | 4/2003 | Edwards ................. | G06T 7/246 348/169 |
| 6,901,110 B1 | * | 5/2005 | Tsougarakis ........... | H04N 5/145 348/E5.066 |
| 9,443,320 B1 | * | 9/2016 | Gaidon .................... | G06K 9/00 |

(Continued)

*Primary Examiner* — Albert Kir

(57) ABSTRACT

Embodiments described herein provide examples of a real-time visual object tracking system. In one aspect, an unmanned aerial vehicle (UAV) capable of performing real-time visual tracking of a moving object includes: a processor; a memory coupled to the processor; and a camera to capture a video of the moving object. This UAV additionally includes a visual tracking module to: receive a first video image and a first location of the object; receive a second video image following the first video image; place a first search window in the first video image and a second search window in the second video image centered on a second location in the second video image having the same coordinates as the first location; compute a correlation between an image patch within the first search window and an image patch within the second search window; and determine an updated location of the object in the second video image.

12 Claims, 8 Drawing Sheets

(56) References Cited

U.S. PATENT DOCUMENTS

| | | | |
|---|---|---|---|
| 2005/0163341 A1* | 7/2005 | Han | G06K 9/3241 |
| | | | 382/103 |
| 2009/0110236 A1* | 4/2009 | Huang | G06T 7/254 |
| | | | 382/103 |
| 2013/0230240 A1* | 9/2013 | Muninder | G06K 9/00234 |
| | | | 382/165 |
| 2015/0222859 A1* | 8/2015 | Schweid | G06K 9/00624 |
| | | | 348/148 |
| 2017/0011281 A1* | 1/2017 | Dijkman | G06K 9/66 |
| 2018/0046188 A1* | 2/2018 | Hwang | G06T 7/277 |
| 2019/0068829 A1* | 2/2019 | Van Schoyck | G05D 1/101 |
| 2019/0103026 A1* | 4/2019 | Liu | G06K 9/00805 |

* cited by examiner

HIGH-PERFORMANCE VISUAL OBJECT TRACKING FOR EMBEDDED VISION SYSTEMS

TECHNICAL FIELD

The present disclosure generally relates to the field of machine vision, and more specifically to systems, devices and techniques for performing real-time visual tracking of objects using video images captured by cameras mounted on unmanned aerial vehicles (UAVs) or drones.

BACKGROUND

Recently, consumer and commercial unmanned aerial vehicles (UAVs) or "drones," a type of miniature pilotless aircrafts, have gained tremendous popularity and commercial success worldwide. An UAV is generally controlled by a remote controller and/or software and uses aerodynamic effects, e.g., generated by multirotors, to maneuver through the air with very high stabilities and to perform various designed functionalities, such as surveillance and package delivery. However, one of the most popular applications of consumer UAVs or drones is aerial photography, i.e., to take still photographs or record videos from a vantage point above the subject being photographed. Recording videos with an UAV typically requires a user of the UAV to skillfully control both the UAV and its camera gimbal. However, such a manual control becomes difficult in some situations, e.g., when the user wants to take videos of himself/herself while the user is walking or when the user wants to take videos of a moving target. In these situations, it becomes necessary that the UAV is able to track the moving target and capture videos automatically.

A number of consumer UAVs provide object tracking capabilities. Note that most of these UAVs rely on using GPS to track a target. In other words, the target being tracked by such a UAV has to be tethered with a GPS device for receiving GPS signals and transmitting its GPS position information back to the UAV, so that the UAV can use the received GPS information to track the target. However, for those targets which do not have GPS receivers or having difficulties acquiring their GPS information, it becomes necessary to include a visual tracking mechanism for the UAV that primarily relies on visual information from the captured videos to track the target without the help from any other sensors and devices such as GPS receivers. A few consumer UAV products on the market have offered high-complexity visual tracking functionalities. Unfortunately, the implementations of these high-complexity visual tracking functionalities generally require that the UAV products be equipped with powerful computational platforms such as Intel Movidius™ Myriad™ 2 vision processing units (VPUs). As such, these existing visual tracking functionalities are not suitable for many low-end consumer UAV products.

Hence, there is a need to provide a low-complexity and yet high-performance visual tracking mechanism which can be implemented on low-end consumer UAV platforms.

SUMMARY

Embodiments described herein provide various examples of real-time visual object tracking systems and techniques for tracking a motion object based on video images. In one aspect, a process for performing real-time visual tracking of a target object captured in a video is disclosed. This process includes the steps of: receiving a first video image of the video and a previously-determined first location of the target object in the first video image; receiving a second video image of the video following the first video image wherein the location of the target object is unknown in the second video image; placing a first search window in the first video image centered on the first location of the target object and a second search window in the second video image at the same location as the first search window in the first video image; computing a correlation map between a first image patch of the first video image within the first search window and a second image patch of the second video image within the second search window; and determining an updated location of the target object in the second video image based on the computed correlation map.

In some embodiments, the first search window and the second search window have the same horizontal and vertical dimensions, and each of the horizontal and vertical dimensions of the first and the second search windows is significantly larger than a corresponding dimension of a bounding box associated with the target object.

In some embodiments, the process computes the correlation map between the first image patch within the first search window and the second image patch within the second search window by: extracting a first feature map from the first image patch and a second feature map from the second image patch; computing a two-dimensional (2D) Fast Fourier Transform (FFT) on the first and second extracted feature maps to generating Fourier representations of the first and second extracted feature maps; computing a cross-correlation between the Fourier representations of the first and second extracted feature maps; and converting the computed cross-correlation back to the spatial domain to obtain the correlation map.

In some embodiments, the process computes the cross-correlation between the Fourier representations of the first and second extracted feature maps by: computing a first feature model for the first feature map by computing a Gaussian kernel auto-correlation of the Fourier representation of the first extracted feature map; computing a second feature model for the second feature map by computing a Gaussian kernel auto-correlation of the Fourier representation of the second extracted feature map; and computing the cross-correlation between the Fourier representations of the first and second extracted feature maps by computing element-wise products of the first feature model and the second feature model.

In some embodiments, the process extracts the first or second feature map from the first or second image patch by: extracting a geometry-based feature map from the image patch; extracting a color-based feature map from the image patch; and concatenating the geometry-based feature map and the color-based feature map to obtain the first or second feature map.

In some embodiments, prior to receiving the first video image, the process further performs the steps of: receiving an earliest video image in a sequence of video frames of the video and a user selected location of the target object within the earliest video image; and performing an object detection operation on the earliest video image to generate a initial location and an initial bounding box for the target object in the earliest video image based on the user selected location.

In some embodiments, the process identifies the location of the target object in the second video image based on the computed correlation map by: identifying a peak value in the computed correlation map; comparing the identified peak value with a first threshold value; and if the identified peak value is greater than or equal to the first threshold value, choosing the location of the peak value as the updated location of the target object in the second video image.

In some embodiments, if the identified peak value is less than the first threshold value, the process further performs of the steps of: receiving a third video image of the video following the second video image; receiving a predicted location of the target object in the third video image from a target motion estimation model, wherein the predicted location is in the vicinity of the first location; searching for the target object locally based on the predicted location; and if the target object is re-identified locally near the predicted location, resuming using the determined location of the target object in the third video image to track the target object in a subsequent video image in the video.

In some embodiments, prior to receiving the predicted location, the process performs the step of training the target motion estimation model using a set of previously-determined locations for the target object in the sequence of video frames.

In some embodiments, the process searches for the target object locally based on the predicted location by: placing a third search window in the third video image centered on the predicted location of the target object; extracting a third feature map from a third image patch of the third video image within the third search window; retrieving a set of stored feature maps computed at a set of previously-determined locations for the target object associated with a set of previously-processed video images; computing a set of correlation maps between the third feature map and each of the set of stored feature maps; and attempting to re-identify the target object in the third video image based on the set of computed correlation maps.

In some embodiments, the process attempts to re-identify the target object in the third video image based on the computed correlation maps by: identifying a peak value in each correlation map of the set of the computed correlation maps; identifying the highest peak value in the set of peak values; comparing the identified highest peak value with a second threshold value; and if the identified highest peak value is greater than the second threshold value, determining that the target object is re-identified.

In some embodiments, the target motion estimation model uses a trained Kalman filter to predict a current location of the target object.

In another aspect, another process for performing real-time visual tracking of a target object captured in a video is disclosed. This process includes the steps of: receiving a first video image of the video and a previously-determined first location of the target object in the first video image; receiving a second video image of the video following the first video image wherein the location of the target object is unknown in the second video image; placing a first search window in the first video image centered on the first location of the target object and multiple second search windows in the second video image at the same location as the first search window in the first video image; computing a set of correlation maps between a first image patch of the first video image within the first search window and each of the multiple second image patches of the second video image within the multiple second search windows; identifying a peak value in each correlation map of the set of the computed correlation maps; identifying the highest peak value in the set of peak values; and determining an updated location of the target object in the second video image based on the location of the highest peak value in the second video image.

In some embodiments, the multiple second search windows include: one or more search windows having different sizes larger than the first search window; one or more search windows having different sizes smaller than the first search window; and another search window having the same size as the first search window.

In some embodiments, prior to computing the set of correlation maps, the process further scales each of the multiple second search windows to the same size as the first search window.

In some embodiments, the process computes a given correlation map between the first image patch within the first search window and a second image patch in the multiple second image patches within the multiple second search windows by: extracting a first feature map from the first image patch and a second feature map from the second image patch; computing a two-dimensional (2D) Fast Fourier Transform (FFT) on the first and second extracted feature maps to generating Fourier representations of the first and second extracted feature maps; computing a cross-correlation between the Fourier representations of the first and second extracted feature maps; and converting the computed cross-correlation back to the spatial domain to obtain the given correlation map.

In yet another aspect, a system capable of performing real-time visual tracking of a target object captured in a video by a camera is disclosed. This system includes one or more processors and a memory coupled to the one or more processors, wherein the memory storing instructions that, when executed by the one or more processors, cause the system to: receive a first video image of the video and a previously-determined first location of the target object in the first video image; receive a second video image of the video following the first video image, wherein the location of the target object is unknown in the second video image; place a first search window in the first video image centered on the first location of the target object and a second search window in the second video image at the same location as the first search window in the first video image; compute a correlation map between a first image patch of the first video image within the first search window and a second image patch of the second video image within the second search window; and determine an updated location of the target object in the second video image based on the computed correlation map.

In still another aspect, an unmanned aerial vehicle (UAV) capable of performing real-time visual tracking of a moving object is disclosed. This UAV includes one or more processors; a memory coupled to the one or more processors; and a camera mounted on a gimbal and coupled to the one or more processors and the memory, and the camera is configured to capture a video of the moving object. This UAV additionally includes a visual tracking module configured to: receive a first video image of the video and a previously-determined first location of the target object in the first video image; receive a second video image of the video following the first video image from the camera, wherein the location of the target object is unknown in the second video image; place a first search window in the first video image centered on the first location of the target object and a second search window in the second video image at the same location as the first search window in the first video image; compute a correlation map between a first image patch of the first video image within the first search window and a second image patch of the second video image within the second search window; and determine an updated location of the target object in the second video image based on the computed correlation map.

In some embodiments, the visual tracking module is further configured to use the determined updated location of the target object to control the flight of the UAV and/or the gimbal.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

UAV Object Tracking Environment

Figure 1:
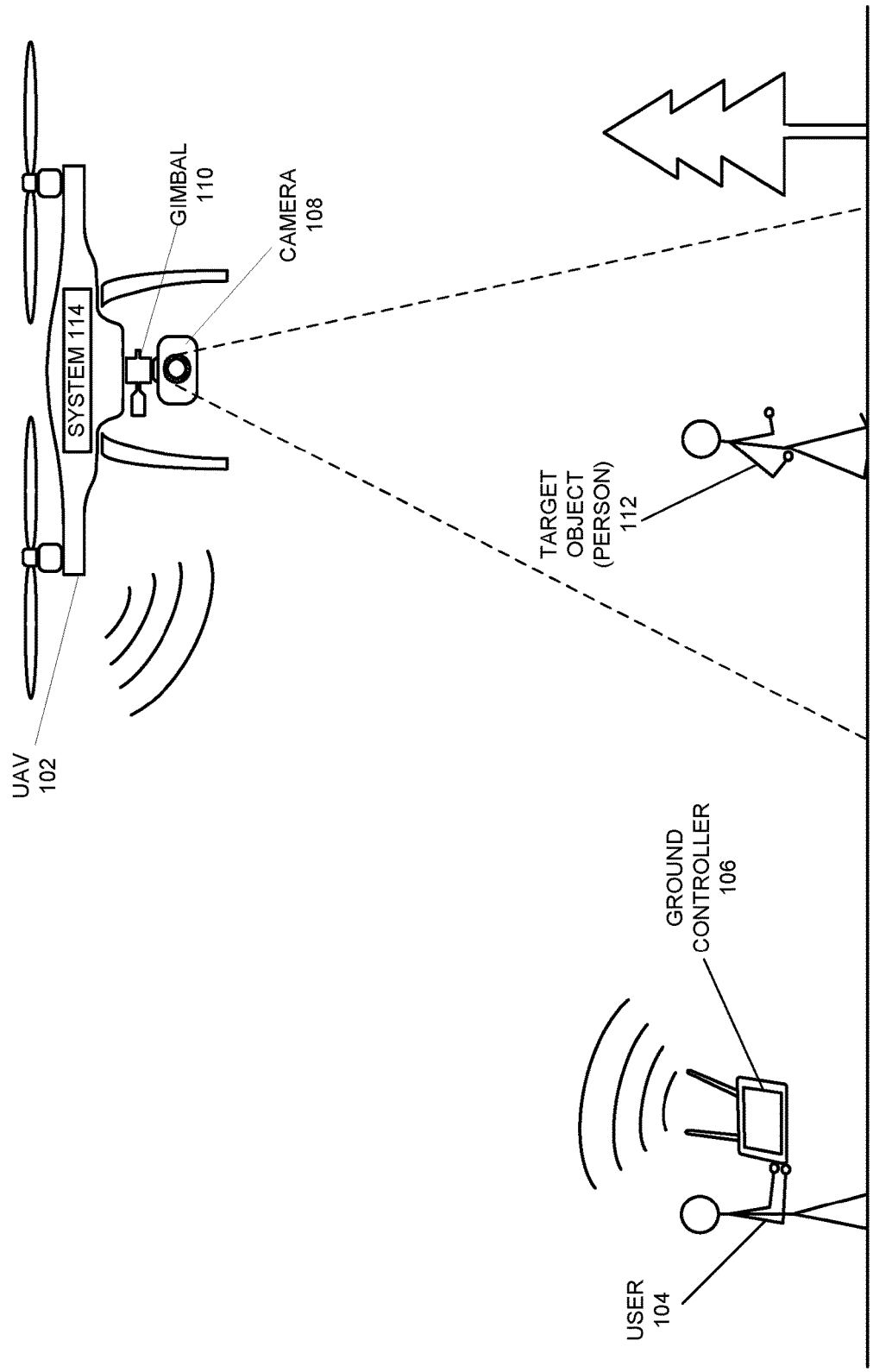
FIG. 1 illustrates an exemplary unmanned aerial vehicle (UAV)/drone object tracking environment which includes a UAV, a user, and a ground controller in accordance with some embodiments described herein.

FIG. 1 illustrates an exemplary unmanned aerial vehicle (UAV)/drone object tracking environment 100 which includes a UAV 102, a user 104, and a ground controller 106 in accordance with some embodiments described herein. As can be seen in FIG. 1, user 104 controls the flight of UAV 102 with ground controller 106, which is a handheld device. UAV 102 includes an onboard camera 108 which is mounted on UAV 102 through a gimbal 110. In some embodiments, gimbal 110 is a three-axis gimbal to allow camera 108 three-degree of freedom in movement. Camera gimbal 110 can also be controlled by user 104 through ground controller 106 so that camera 108 can aim at a location or a target selected by user 104. While in flight, camera 106 onboard UAV 102 can capture a sequence of video frames at a given frame rate, and the captured video frames can be transmitted through radio signals from UAV 102 to ground controller 106, which can include a graphic user interface (GUI) to display the received video images.

In some embodiments, UAV 102 is configured to perform a real-time visual object tracking operation to track a moving target, such as a moving person 112. In some embodiments, the system for performing the disclosed visual object tracking operations can be implemented on a platform (e.g., a system-on-chip (SoC)) embedded within UAV 102. However, in some other embodiments, the system for performing the disclosed visual object tracking operations can be implemented partially on UAV 102 and partially on ground controller 106. In such embodiments, performing the disclosed visual object tracking operations requires that UAV 102 and ground controller 106 perform collaborative tracking functions. In the embodiment of FIG. 1, the disclosed visual object tracking operations are implemented on UAV 102 as visual object tracking system 114 (or simply "system 114"). However, the disclosed object tracking system 114 can receive certain information from ground controller 106 related to the tracking operation, e.g., a selection of a target object by user 104.

In some embodiments, to begin a disclosed visual object tracking operation, user 104 selects an object of interest (such as moving person 112 or a moving vehicle (not shown)) on the display of ground controller 106. For example, if the display of ground controller 106 is implemented as a touch-screen, user 104 can simply select the object of interest (also referred to as the "target object" hereinafter) on the touch-screen by pointing/touching on the target object. In some embodiments, after user 104 has made the selection through ground controller 106, UAV 102 receives the user selection and a real-time visual object tracking operation can begin. In some embodiments, the user selection on ground controller 106 triggers an object detection module to detect the boundary of the target object around the initially specified location by user 104. Depending on the configurations of UAV 102 and ground controller 106, this object detection module can be implemented either on UAV 102 or on ground controller 106. If the object detection module is implemented on ground controller 106, the object detection module outputs the bounding box coordinates for the detected object of interest which is subsequently wirelessly transmitted from ground controller 106 to UAV 102. Note that within this generated bounding box is a "region of interest" (ROI) image (hence, the terms "bounding box" and "ROI" are used interchangeably below) which is to be tracked during a disclosed object tracking operation. However, if the object detection module is implemented on UAV 102, this object detection module can be part of the visual object tracking system 114.

Note that alternatively or in addition to selecting an object of interest by pointing/touch on a single location on the display of ground controller 106, user 104 can also make a selection by drawing an initial bounding box around an object of interest on the display of ground controller 106. Next, the object detection module can automatically update the boundary of the object of interest based on the initial bounding box and subsequently output the updated bounding box coordinates for the object of interest. Once again, depending on the configurations of UAV 102 and ground controller 106, this object detection module can be implemented either on UAV 102 as part of system 114 or on ground controller 106. In the following discussion, it is assumed that the object detection module is part of visual object tracking system 114 integrated with UAV 102.

Embedded Visual Object Tracking System

Figure 2:
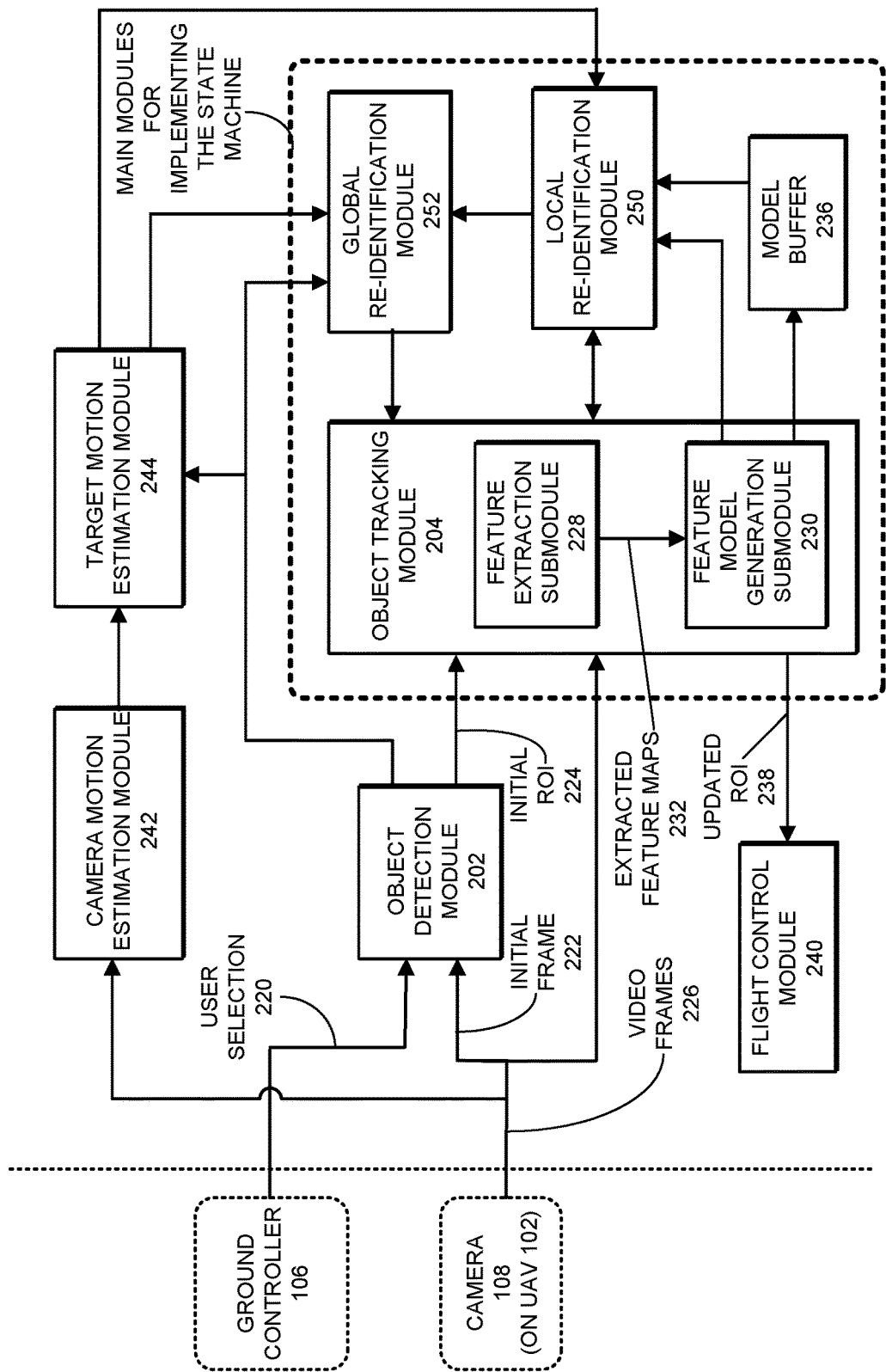
FIG. 2 illustrates an exemplary implementation of the visual object tracking system described in FIG. 1 in accordance with some embodiments described herein.

FIG. 2 illustrates an exemplary implementation 200 of visual object tracking system (or "visual tracking system") 114 in FIG. 1 in accordance with some embodiments described herein. As can be seen in FIG. 2, visual tracking system 200 includes various functional modules to perform various functionalities including, but are not limited to, object detection, feature extraction, feature model generation, object tracking, camera motion estimation, target motion estimation, and object re-identification. Visual tracking system 200 is integrated with UAV 102 to facilitate controlling the flight of UAV 102 and positioning of camera 108. However, the disclosed visual tracking system 200 can also be implemented on other embedded platforms to perform other visual tracking functionalities. These other embedded platforms can include, but are not limited to, a robotic system, a video surveillance system, a self-driving vehicle, a mobile device, and other machine vision systems.

Note that visual tracking system 200 includes at least an object detection module 202, an object tracking module 204, a local re-identification module 250, a global re-identification module 252, a camera motion estimation module 242, and a target motion estimation module 244. Visual tracking system 200 can also include additional modules not shown in FIG. 2. We now describe various modules and functional blocks within visual tracking system 200 in more detail.

Initial Object Detection

As can be seen in FIG. 2, object detection module 202 is coupled to both ground controller 106 and camera 108 of UAV 102 as have been described in conjunction with FIG. 1. Note that dashed lines are used around ground controller 106 and camera 108 in FIG. 2 to indicate that ground controller 106 and camera 108 are not part of visual tracking system 200. During a visual object tracking operation, object detection module 202 can receive a user selection 220 from ground controller 106, wherein user selection 220 can include either a point of interest or an approximated region of interest generated by user 104 as described above. Moreover, object detection module 202 can receive a sequence of video images (also referred to as "video frames" or "frames" hereinafter) captured by camera 108. In particular, object detection module 202 can receive an "initial" video frame 222 (also referred to as "first video frame" below) within which user 104 has made selection 220. Based on the received user selection 220 and initial video frame 222, object detection module 202 is configured to detect the target object of which user 104 has instructed UAV 102 to track and subsequently output the determined bounding box coordinates of the detected target object. These bounding box coordinates define a "region of interest" (ROI) image within the first video frame 222 and thereby are also referred to as the "ROI" hereinafter. As can be seen in FIG. 2, object detection module 202 outputs initial ROI 224 of the detected target object. Note that many different techniques can be used to implement object detection module 202. For example, a histogram of oriented gradients (HoG) technique in conjunction with a support vector machine (SVM) classifier can be used to implement object detection module 202.

In some embodiments, object detection module 202 is implemented with a fast object technique which has low-computational complexity. One of such fast object techniques includes an aggregated channel features (ACF)-based technique described in Dollar et al., "*Fast feature pyramids for object detection,*" *IEEE Transactions on Pattern Analysis and Machine Intelligence*, Vol. 36, Issue 8, 2014, pp. 1532-1545. More detail of using an ACF-based technique for object detection using object detection module 202 is provided below in conjunction with FIG. 3. However, object detection module 202 can be implemented with other known or later developed low-complexity object detection techniques without departing from the scope of the described technology.

Figure 3:
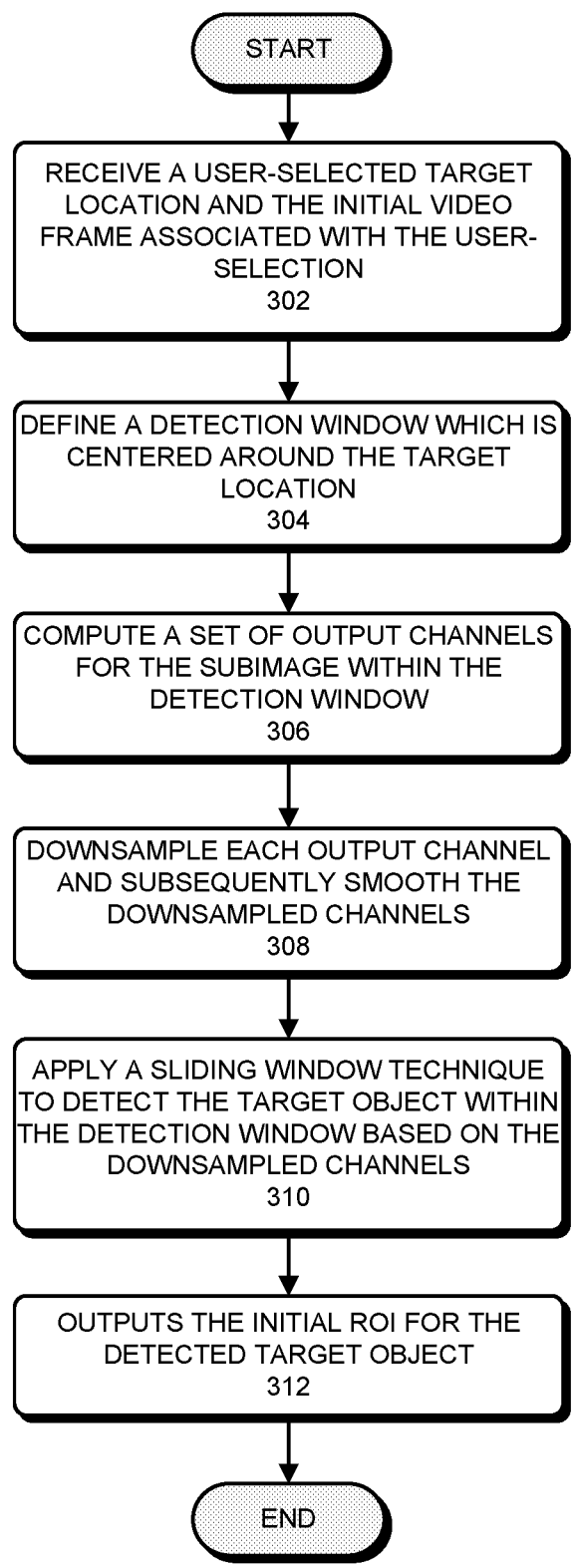
FIG. 3 presents a flowchart illustrating an exemplary process for performing target object detection using the disclosed object detection module in accordance with some embodiments described herein.

FIG. 3 presents a flowchart illustrating an exemplary process for performing target object detection using object detection module 202 in accordance with some embodiments described herein. The process can begin when object detection module 202 receives a user-selected target location and the initial video frame associated with the user selection from user 104 (step 302). As described above, the user can select a target object to be tracked on the display of ground controller 106 by pointing/touching on a single location within the target object on the screen, or by drawing an initial bounding box around the target object on the screen. Next, based on the received target location, the process defines a detection window which is centered around the target location (step 304). In some embodiments, the size of the user-defined detection window can be between a portion of the received video frame and the entire received video frame. For example, the size of the detection window can be approximately half that of the entire video frame and centered around the user-selected target location. Generally, the actual size of the detection window can be determined partially based on the processing speed of the hardware platform (e.g., the particular processor(s)) on which the disclosed object detection process is performed.

Next, the process computes a set of output channels for the subimage within the detection window in the initial video frame (step 306). For example, the set of output channels can include the separate color channels of the initial video frame and the histograms of oriented gradients (HoG) of these color channels. After computing the set of output channels, the process of FIG. 3 downsamples each output channel by summing up the pixels within a predefined block region (e.g., a block of 4×4 pixels), and subsequently smoothes the downsampled channels (step 308). The process then applies a sliding window technique to detect the target object within the detection window based on the downsampled channels (step 310). More specifically, within each application of a given sliding window, the pixels in all of the downsampled channels can be combined into a single vector, and a fast pyramid construction technique can be used to estimate and extract features within the sliding window at multiple scales. These extracted features are typically referred to as the aggregated channel features (ACFs). Next, the process of step 310 can use the extracted ACFs as inputs to a machine learning algorithm, such as an AdaBoost classifier or a SVM to estimate the probability of having the target object within the given sliding window. Note that this process is repeated for each sliding window placement within the detection window, so that the entire detection window can be searched for the target object. Finally, the process outputs initial ROI 224 for the detected target object (step 312).

Note that while we've described object detection module 202 based on a four-channel ACF-based object-detection technique (i.e., three color channels and one HoG channel), object detection module 202 can also be implemented with other ACF-based object-detection techniques using fewer or greater numbers of output channels than the four channels described above. In some embodiments, the multiple channels used by a given ACF-based object-detection technique can include a combinations of the following channels: one or more color/grayscale channels, one or more texture-based channels such as Gabor filter-based channels, difference of Gaussians (DoG), nonlinear filter-based channels such as edge detectors, and above-described HOG channel, among others. However, in some embodiments, object detection module 202 can be implemented with an ACF-based object-detection technique which uses only color/grayscales channels or only texture-based channels. In general, object detection module 202 can be implemented with any low-complexity object-detection technique which is suitable for low-cost embedded system implementations.

In the embodiment of FIG. 1 and FIG. 2, object detection module 202 is shown as a component of visual tracking system 200 implemented on UAV 102. However, object detection module 202 can also be implemented on ground controller 106. In this embodiment, object detection module 202 is not a component of visual tracking system 200 but a part of ground controller 106, and object detection module 202 is communicatively coupled to visual tracking system 200 through wireless link. Whether object detection module 202 is implemented on UAV 102 or on ground controller 106 can depend on the particular hardware configuration of UAV 102 and ground controller 106. In some embodiments, by carefully selecting the ACF parameters, high object-detection performance and fast detection speed can be achieved on low-end hardware platforms which are used to implement object detection module 202. Note that object detection module 202 can also be used in an object re-identification operation when the target object is lost during a visual object tracking process. This object re-identification operation is described in more detail below.

Image Feature-Based Object Tracking

Referring back to FIG. 2, note that object detection module 202 is coupled to object tracking module 204, which receives a sequence of video frames 226 from camera 108. In some embodiments, once the target object is identified and initial ROI is received by object tracking module 204, object tracking module 204 is triggered to perform a real-time visual tracking operation to track the target object through the sequence of video frames 226 after initial video frame 222. In some embodiments, every video frame of the sequence of video frames 226 can be processed by object tracking module 204 during the target tracking operation. In these embodiments, object tracking module 204 attempts to re-identify the target object in each new video frame in the sequence of video frames 226. In other embodiments, only one in every N video frames in the sequence of video frames 226 is processed (e.g., N=4) by object tracking module 204 during the target tracking operation.

Note that just like object detection module 202, many different techniques can be used to implement object tracking module 204. For example, one way to track the target object is to track the entire ROI image (starting from initial ROI 224) of the target object from a "previous video frame" to a "current video frame." Note that in the context of the disclosed visual track operation, the term "previous video frame" refers to a video frame in the sequence of video frames 226 which was most-recently processed by object tracking module 204, whereas the term "current video frame" refers to a video frame in the sequence of video frames 226 which is newly received and currently being processed by tracking module 204. Hence, the current video frame follows the previous video frame in the sequence of video frames 226. Note that one exception from the above definition is when the target object was initially detected. In this scenario, the previous video frame corresponds to the initial video frame 222, which was processed by object detection module 202 instead of by object tracking module 204; wherein the current video frame corresponds to a newly received video frame after the initial video frame 222.

In the embodiment of visual tracking system 200, to improve the robustness of the object tracking operation, object tracking module 204 can be configured to track certain image features of the target object instead of directly tracking the ROI image of the target object. As can be seen in FIG. 2, object tracking module 204 can include a feature extraction submodule 228 for extracting such image features. More specifically, feature extraction submodule 228 can be configured to extract certain image features from a region of the current video frame which is considered highly likely to contain the target object. Because this region for feature extraction should contain the target object, i.e., the ROI, the extracted features by feature extraction submodule 228 can be referred to as "ROI features," or "ROI feature maps." It should be noted that these ROI features are used for object tracking purpose, and therefore not to be confused with the ACFs used for target object detection as described above. For example, one of the differences between the ROI features and ACFs is that the ACFs are extracted from the above-described detection window which has a different size (typically much larger) from the size of a feature-extraction window for the ROI features. The size of the extraction window (also referred to as "search window" below) for the ROI features is described in more detail below.

Figure 4:
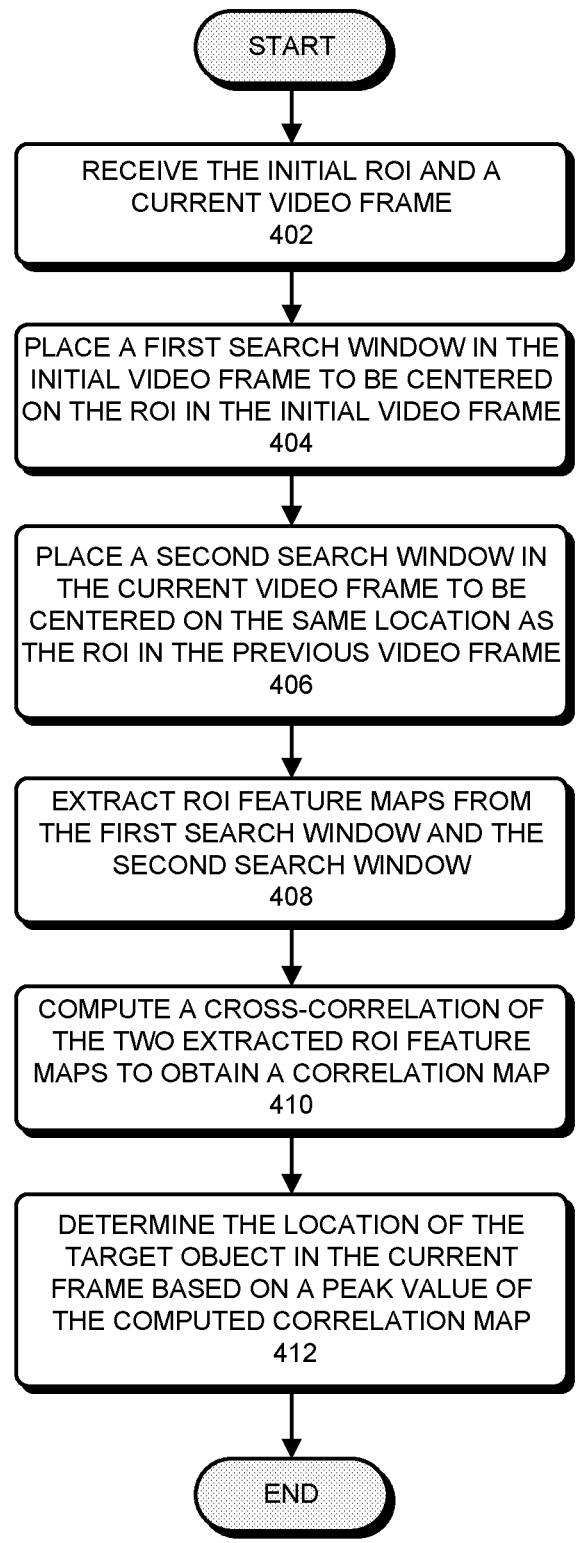
FIG. 4 presents a flowchart illustrating an exemplary process for tracking the target object from the initial video frame to a current video frame using the disclosed object tracking module in accordance with some embodiments described herein.

FIG. 4 presents a flowchart illustrating an exemplary process for tracking the target object from initial video frame 222 to a current video frame using object tracking module 204 in accordance with some embodiments described herein. As described above, initial video frame 222 has been processed by object detection module 202, and the current video frame corresponds to a newly received video frame in the sequence of video frame 226 following the initial video frame 222. After processing initial video frame 222, object detection module 202 determines the location of the target object within initial video frame 222 and subsequently outputs initial ROI 224 of the target object within initial video frame 222. Because the target object, such as target 112 in FIG. 1 is generally moving, the goal of object tracking module 204 is to determine the new location of the target object in the current video frame and generate an updated ROI for the target object within the current video frame.

The tracking process begins after object tracking module 204 receives initial ROI 224 of the target object from object detection module 202 (step 402). Object tracking module 204 additionally receives a new video frame (i.e., the current video frame) following initial video frame 222 from camera 108 (step 402). For simplicity, we also refer to the initial video frame 222 as the previous video frame in the discussion below.

Next, to search for the target object in the current video frame, the process places a first search window in the previous video frame such that the first search window is centered on the ROI in the previous video frame (step 404). As described above, the target object has a determined location and a corresponding ROI/bounding box in the previous video frame. The process additionally places a second search window in the current video frame such that the second search window is centered on the same location in the current video frame as the ROI determined in the previous video frame (step 406). Because the previous video frame and the current video frame have the same size, and the first search window and the second search window are placed at the same location in the respective video frames, the first search window in the previous video frame and the second search window in the current video frame are "co-located." In some embodiments, the first search window and the second search window have the same size, and the size of the search windows can be chosen such that there is a very high probability that the new location of the target object will still be within the second search window in the current video frame. For example, some typical horizontal and vertical dimensions of the first and second search windows can be approximately 2-2.5 times of the corresponding dimensions of the ROI determined in the previous video frame. In practice, the actual size of the first and second search windows can be determined as a trade-off between processing speed and the probability of locating the target object in the new video frame.

Next, the process extracts ROI feature maps from the first search window in the previous video frame and the second search window in the current video frame, respectively (step 408). In a particular embodiment, a ROI feature map extracted from each of these two search windows is the concatenation of the above described HoG feature map (for more detail see Dalal et al., "*Histograms of oriented gradients for human detection,*" *Proc. of* 2005 *IEEE Conf on Computer Vision and Pattern Recognition*, June 2005) and a "LAB" color centroid feature map. The computation of HoG feature typically involves gradient computation, orientation binning, and block normalization. The LAB color space typically includes three dimensions: L for lightness, A and B for the green-red and blue-yellow color opponents respectively. Note that the LAB color is designed to approximate human vision. Hence, unlike RGB and CMYK spaces, the Euclidian distance of two points in the LAB color space corresponds to the perceptual difference of human eyes. Note that using the combined geometry-based HoG feature and color-based LAB color centroid as the ROI feature for target object detection/tracking can significantly improve the distinguishing capability of object tracking module 204. Note that ROI features which can be extracted from the search windows are not limited to the above described HoG and LAB color combination. Other ROI features which can be extracted from the received video frames and used for target tracking can include corner features, scale-invariant feature transform (SIFT), optical flow, and ColorName. Moreover, ROI features can also include trained features such as convolutional neural network (CNN) features.

Note that because the location of the target object in the previous video frame is known, the target object in the current video frame can be identified by computing the correlation between the extracted ROI feature map in the previous video frame and the extracted ROI feature map in the current video frame. Hence, after the ROI feature maps have been extracted from the two co-located search windows, the process computes a cross-correlation between the two extracted ROI feature maps to generate a correlation map (step 410). The process subsequently determines the location of the target object in the current frame based on a peak value of the computed correlation map between the two extracted ROI feature maps corresponding to the two video frames (step 412). In some embodiments, to avoid false positives, the location of the peak value in the correlation map is selected as the location the target object in the current video frame only if the peak value is greater than or equal to a predetermined threshold value.

Note that while the exemplary process of FIG. 4 for tracking the target object using object tracking module 204 is described in terms of the initial tracking step from initial video frame 222 to a new video frame following initial video frame 222, the described process can be easily extended and repeated for tracking the target object from any given previous video frame that has just been processed by object tracking module 204 and has the most up-to-date ROI to any given current video frame following the given previous video frame.

In some embodiments, to speed up the correlation computation in step 410 above, a Fourier domain approach can be used. For example, a two-dimensional (2D) Fast Fourier Transform (FFT) can be used to find the Fourier representations of the two extracted ROI feature maps from the two co-located search windows. Next, cross-correlation between the frequency domain representations of the two extracted ROI feature maps can be computed (e.g., by computing element-wise product) and then an inverse FFT can be applied to the computed correlation maps back to the spatial domain. The peak value (e.g., if that value is above a predetermined threshold) in the correlation map in the spatial domain and its location in the correlation map can be used as the central location of an updated ROI of the target object in the current video frame. In some embodiments, prior to computing the cross-correlation between the two Fourier representations of the two extracted feature maps, the Gaussian kernel auto-correlation of each of the two Fourier representations is first computed. Each of the computed Gaussian kernel auto-correlation can be referred to as the "feature model" of the respective search window. Next, computing the cross-correlation between the frequency domain representations of the two extracted ROI feature maps involves computing the element-wise product of the two feature models associated with two extracted ROI feature maps.

In some embodiments, the above-described FFT operations and Gaussian kernel auto-correlation operations to compute the feature models can be performed by a feature model generation submodule 230, which is shown in FIG. 2 as a component of object tracking module 204. Note that feature model generation submodule 230 is coupled to feature extraction submodule 228 to receive extracted ROI feature maps 232 from feature extraction submodule 228. In addition to the use by object tracking module 204 for object tracking, the feature models generated by feature model generation submodule 230 can be used by some other modules within visual tracking system 200. These modules include at least local re-identification module 250 and global re-identification module 252, and certain operations of these modules are described below.

A motivation for performing correlation computation in the Fourier domain is as follows. In some embodiments, object tracking based on analyzing the correlation between two search windows applied to the two video frames constitutes a learning problem of training a regression model. This typically involves evaluating multiple correlations using multiple horizontally and vertically shifted versions of the search window, which can be a highly computation-intensive process. However, by transforming the computation into Fourier domain, this learning problem can be formulated into a circulant problem represented by circulant matrices, which can be made diagonal by the Discrete Fourier Transform (DFT). Once in the Fourier domain, correlation of circulant matrices is simplified into element-wise product of cost of $O(n)$ instead of full matrix product with cost of $O(n^3)$ (for more detail see Henriques et al., "High-speed tracking with kernelized correlation filters," *IEEE Transactions on Pattern Analysis and Machine Intelligence*, vol. 37, No. 3, 2015, pp. 583-596). As a result, the correlation computation is significantly simplified and sped up.

Figure 5:
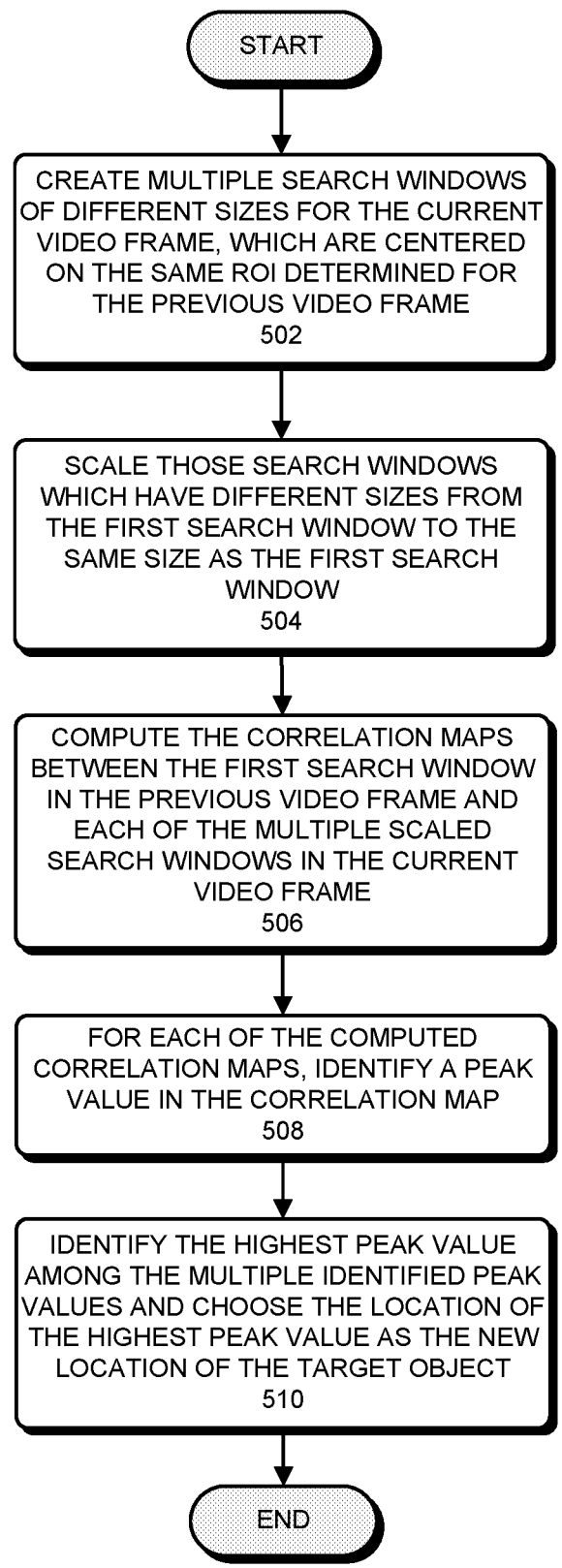
FIG. 5 presents a flowchart illustrating an exemplary process for computing the cross-correlation of the extracted ROI feature maps between the previous video frame and current video frames based on using multiple search windows in accordance with some embodiments described herein.

Note that in the exemplary process of FIG. 4, the cross-correlation of the extracted ROI feature maps was computed between a single search window (i.e., the first search window) in the previous video frame and a single search window (i.e., the second search window) in the current video frame. However, when the tracked target object is in motion, the size of the target object can change over time within the sequence of video frames 226. To take into account the potential size change of the target object and to improve the reliability of the disclosed tracking process, object tracking module 204 can employ multiple search windows of different sizes for the current video frame in place of a single second search window approach. FIG. 5 presents a flowchart illustrating an exemplary process for computing the cross-correlation of the extracted ROI feature maps between the previous video frame and current video frames based on using multiple search windows in accordance with some embodiments described herein. Note that this process can be as an alternative to steps 406-410 in the exemplary process of FIG. 4.

Specifically, the process of FIG. 5 first creates multiple search windows of different sizes for the current video frame such that these windows are all substantially centered on the same ROI determined for the previous video frame (step 502). In some embodiments, the sizes of the multiple search windows can be configured such that one or more of these search windows are larger than the first search window. These larger search windows can be used to anticipate situations where the target object will increase in size in the current video frame. The multiple search windows can also include one or more search windows which are smaller than the first search window. These smaller search windows can be used to anticipate situations where the target object will decrease in size in the current video frame. The multiple search windows can also include another search window which has the same size as the first search window. This search window can be used to anticipate the situation where the target object remains in the same size in the current video frame. Note that this same size search window can be equivalent to the second search window in the process of FIG. 4.

In a specific example, three search windows of three different sizes can be created for the current video frame wherein these three search windows are all centered on the ROI determined in the previous video frame. More specifically, the first one of the three search windows has the same size as the first search window, the second one has a slightly smaller size than the first search window, and the third one has a slightly larger size than the first search window.

After creating the multiple search windows for the current video frame, the process scales those search windows which have different sizes from the first search window to the same size as the first search window (step 504). In other words, a larger search window will be downsampled to the size of the first search window, whereas a smaller search window will be upsampled to the size of the first search window. In this manner, each of the scaled search windows can be compared with the first search window in the previous window frame in the same manner describe above.

Next, the process computes the correlation maps between the first search window in the previous video frame and each of the multiple scaled search windows in the current video frame (step 506). More specifically, the process can compute the correlations between the extracted ROI feature map from the first search window in the previous video frame and each of the multiple extracted ROI feature maps from the multiple scaled search windows in the current video frame. In some embodiments, to compute the correlation between each pair of the ROI feature maps, the process applies the above-described FFT-based approach to convert the ROI feature maps into the frequency domain, computing the correlation in the frequency domain, and converting the computed correlation map back to the spatial domain. In some embodiments, before computing the correlation map between a pair of converted ROI feature maps in the frequency domain, the above-described feature models for the pair of converted ROI feature maps are first calculated, and then the correlation map is computed between the pair of feature models associated with the pair of converted ROI feature maps.

Next, for each of the computed correlation maps between the first search window in the previous video frame and each of the multiple scaled search windows in the current video frame, the process identifies a peak value in the correlation map (step 508). Next, the process identifies the highest peak value among the multiple identified peak values and chooses the location of the highest peak value as the new location of the target object in the current frame (step 510). In some embodiments, to avoid false positives, the location of the highest peak value is selected as the updated location of the target object in the current video frame only if the highest peak value is greater than the predetermined threshold value.

Referring back to visual tracking system 200, note that visual tracking system 200 also includes a model buffer 236. In some embodiments, the feature models computed for the search windows associated with a few (e.g., 4-10) most-recently processed video frames as well as the feature model for the initial video frame 222 can be saved in model buffer 236. In some embodiments, when multiple search windows are used to process each current video frame as described in conjunction with FIG. 5, only the feature model associated with the search window associated with the highest peak value needs to be saved in model buffer 236. As will be described below, the saved feature model values can be used during an object re-identification process when the target object is potentially lost during the tracking by object tracking module 204.

Note that when the target object is being tracked by object tracking module 204, object tracking module 204 continues generating updated ROIs 238 of the target object. These updated ROIs, i.e., the updated bounding boxes of the target object are useful for a number of purposes. Firstly, a newly updated ROI 238, which is the output of object tracking module 204, can be used as the input to a flight control module 240. In some embodiments, using the updated ROI values, flight control module 240 can control the flight of UAV 102 in order to maintain a near constant distant between the target object and UAV 102. More detail of flight control module 240 using updated ROIs 238 to control the flight of UAV 102 is provided below. Secondly, the center position of an updated ROI 238 can be used as the center of the search window for the current video frame. Moreover, a newly updated ROI 238 can be used to update a Kalman filter for predicting the location of the target object. The predicted location by the Kalman filter can be used to re-identify the target object when the target object is lost by object tracking module 204 (more detail of which is described below).

In some embodiments, to improve the speed of the object tracking operation, the software implementation of the feature extraction submodule 228 can be optimized. For example, memory layout and access ordering can be used to reduce the memory bandwidth requirement, increase cache locality, and increase the temporal cache coherence of the processor. One can also exploit some hardware features not exposed to high-level computer languages. These optimizations can also be used in some other components of object tracking system 200.

UAV Flight Control

Note that the flight of UAV 102 can usually be controlled through rotational motions in two dimensions: (1) a roll motion, i.e., the rotation about an axis running from the nose to the tail of UAV 102; and (2) a pitch motion, i.e., the rotation about an axis running from the left-hand-side to the right-hand-side of UAV 102 (commonly referred to as "nose up or nose down"). As described above, the updated ROI 238 defines a new bounding box of the target object in the current video frame. When the new bounding box appears on the left side of the current video frame, it is usually an indication that the target object is to the left of UAV 102. In this case, flight control module 240 can cause UAV 102 to roll to the left. When the new bounding box appears on the right side of the current video frame, it is usually an indication that the target object is now to the right of UAV 102. In this case, flight control module 240 can cause UAV 102 to roll to the right. In both cases, the angles of roll motions can be determined by the horizontal offset between the center of the bounding box to the center of the image frame.

In some embodiments, if the area of the new bounding box becomes smaller than the preceding bounding box, it is usually an indication that the distance between UAV 102 and the target object has increased. In this case, flight control module 240 can cause UAV 102 to pitch downward which then causes UAV 102 to speed up if UAV 102 is flying forwards or to slow down if UAV 102 is flying backward. Alternatively, if the area of the new bounding box becomes larger than the preceding bounding box, it is usually an indication that the distance between UAV 102 and the target object has decreased. In this case, flight control module 240 can cause UAV 102 to pitch upward which then causes UAV 102 to slow down if UAV 102 is flying forward or to speed up if UAV 102 is flying backward. In both cases, the angles of pitch motions can be determined by the area of the new bounding box compared to the area of the initial bounding box when the target object was initially detected, or to a user-defined-default bounding box size. Note that flight control module 240 can also control the altitude of UAV 102 based on the new bounding box. For example, when the new bounding box has a vertical offset from the center of the current video frame, flight control module 240 can cause UAV 102 to fly up or down to reduce the vertical offset. A motivation of controlling the flight of UAV 102 is to keep the target object at or near the center of the video frames and the area of the ROI/bounding box of the target object substantially unchanged.

Note that flight control module 240 can also be configured to control the angle of camera 108 by controlling gimbal 110. In the global re-identification state 606 described below in conjunction with state machine 600 in FIG. 6, UAV 102 temporarily loses track of the target object. In this operating state, flight control module 240 can control UAV 102 to make it hovering without moving or rotating but at the same time to vary the angles of camera gimbal 110 to search for the lost target object. Note that gimbal 110 typically has three axes of rotations. When controlling gimbal 110, any gimbal adjustment technique can be applied so long as the rotation speed of camera 108 is sufficiently slow to allow the global re-identification module a sufficient amount of time to process video images captured at different camera angles.

Camera Motion Estimation

Referring back to FIG. 1, note that to track a moving target object such as moving person 112, UAV 102 can either substantially stay still (e.g., by hovering above the target object being tracked without following the target object), or follow the target object closely by keeping a near constant distant from the target object. In the latter scenario, UAV 102 is required to mimic the motion of the target object. When UAV 102 flies along with the target object, camera 108, which is part of UAV 102 is also moving in the same manner as UAV 102. Moreover, camera 108 can also have certain movement itself on its gimbal 110 independent of the motion of UAV 102, e.g., to have a small degree of rotation. Hence, to improve visual tracking accuracy of visual tracking system 200, it is often necessary to know the motion of camera 108. Referring back to FIG. 2, note that visual tracking system 200 can camera motion estimation module 242 to estimate the motion of camera 108.

As can be seen in FIG. 2, camera motion estimation module 242 can receive the sequence of video frames 226 from camera 108. In some embodiments, camera motion estimation module 242 is configured to estimate the motion of camera 108 by taking two consecutive video frames captured by camera 108 and calculating a relative offset between the two frames. Due to the limitation of computation resources on UAV 102, it is often impractical (in fact, it is also unnecessary) to feed the entire frames to camera motion estimation module 242. Instead, a patch within each frame can be used to compute the offset. In some embodiments, the actual size of the patch used by camera motion estimation module 242 to compute the offset can be chosen to be sufficiently large to enable accurate camera motion estimation and also to be robust against noise. For example, for a 720p video stream (i.e., video frames of size of 1280×720 pixels), the patch size can be ~10% of the actual frame size in each dimension (e.g., 120×68 pixels for frames of size of 1280×720 pixels). To avoid including the target object in the patch, which could affect the estimation of the camera motion, the patch position can be selected to be away from the center of a frame, e.g., near an edge of the frame. This patch selection technique often works well because the target object is generally located around the center of the video frames.

Referring back to FIG. 2, note that camera motion estimation module 242 is coupled to a target motion estimation module 244, which itself is coupled to local re-identification module 250 and global re-identification module 252. As will be described in more detail below, target motion estimation module 244 is configured to predict the motion of the target object during a visual object track process, which would allow the approximated position of the target object to be predicted. The predicted target location can be used by both local re-identification module 250 and global re-identification module 252 during local and global object re-identification procedures when the target object is potentially lost by object tracking module 204. When predicting the target motion, target motion estimation module 244 can subtract the estimated camera motion from the prediction target motion to correct the effect from the camera motion.

State Machine: Object Tracking with Object Re-Identification

The above-described visual tracking operations performed by object tracking module 204 typically work well when the target object's position and shape do not change significantly from one video frame to the next video frame (i.e., from the previous video frame to the current video frame). However, in some situations, the target object's position and shape can change rapidly, which could cause the above-described simple visual tracking procedure by object tracking module 204 alone to fail, i.e., to lose track of the target object within the current video frame. In such situations, a more complex visual tracking procedure including object re-identification functionalities to re-identify the target object within the new video frames can be used. Referring back to visual tracking system 200 of FIG. 2, note that local re-identification module 250 and global re-identification module 252 are interconnected with object tracking module 204. These two modules individually or together are designed to perform object re-identification functionalities after object tracking module 204 has lost track of the target object, e.g., due to a sharp change in speed and/or shape of the target object.

In the proposed visual tracking system 200, tracking module 204, local re-identification module 250, and global re-identification module 252 can operate in tandem but also during different operating states of visual tracking system 200. These operating states can include a normal tracking state already described above and performed by object tracking module 204, a local re-identification state performed by local re-identification module 250, and a global re-identification state performed by global re-identification module 252. In some embodiments, the local re-identification state is engaged when the target object is considered potentially lost during the normal tracking state. During the local re-identification state, local re-identification module 250 can search for the target object within a local area near the location where the target object was last determined in an attempt to quickly re-identify the target object. If local re-identification module 250 successfully re-identifies the target object, the overall tracking operation can return to the normal tracking state. Otherwise, the target object is considered locally lost and the global re-identification state is then engaged. During the global re-identification state, global re-identification module 252 can search for the target object globally, i.e., at multiple locations within a current video frame. If global re-identification module 252 successfully re-identifies the target object within the current video frame, the overall tracking operation can return to the normal tracking state. Otherwise, the target object is considered completely lost and the overall tracking operation can be reset. Hence, the proposed overall tracking operation by visual tracking system 200 may be described by a state machine which includes the above-described three tracking states.

Figure 6:
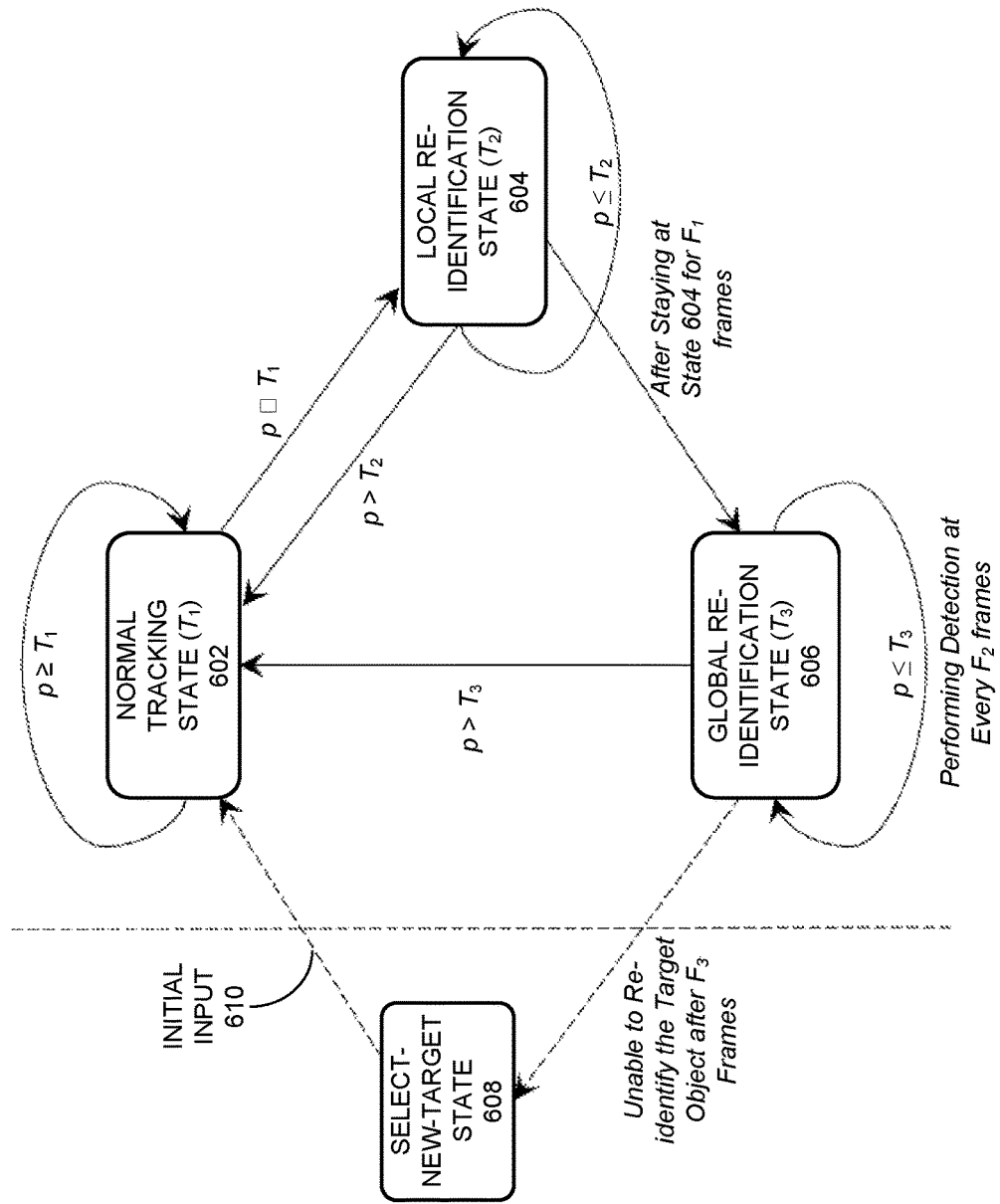
FIG. 6 shows a state machine implementation of the disclosed visual tracking system with object re-identification functionalities in accordance with some embodiments described herein.

FIG. 6 shows a state machine 600 implementation of visual tracking system 200 with object re-identification functionalities in accordance with some embodiments described herein. Note that state machine 600 is described below in the context of visual tracking system 200 in FIG. 2. As can be seen in FIG. 6, state machine 600 includes the three above-described states: normal tracking state 602, local re-identification state 604, and global re-identification state 606. In the context of visual tracking system 200, normal tracking state 602 can be implemented by tracking module 204, local re-identification state 604 can be implemented by local re-identification module 250, and global re-identification state 606 can be implemented by global re-identification module 252. In some embodiments, state machine 600 also includes a select-new-target state 608, which can prompt user 104 to select a new object of interest and receive the user selection. Once a new target object has been selected, select-new-target state 608 can generate an initial input 610 for normal tracking state 602, which causes state machine 600 to enter normal tracking state 602.

In some embodiments, after entering normal tracking state 602, object detection module 202 first generates the initial ROI for the target object, and then object detection module 204 continues to track the target object through the sequence of new video frames. When the above-described ROI feature-based tracking technique is used, a new peak value p is identified from the computed correlation map for each new video frame. In some embodiments, instead of using only the newly processed video frame, the peak value p is computed as a weighted average of several peak values obtained from several most-recently processed video frames. In some embodiments, the weights for the weighted average can be chosen such that a weight is greater for a latter video frame in the several most-recently processed video frames and smaller for an earlier video frame in the several most-recently processed video frames.

Note that normal tracking state 602 is configured with a predetermined threshold parameter $T_1$, which can be an empirically determined value for the visual tracking system 200. In some embodiments, each time a new video frame is processed, the newly identified peak value p is compared with $T_1$. As shown in FIG. 6 at state 602, state machine 600 remains in normal tracking state 602 as long as the newly acquired peak value p is equal to or greater than threshold $T_1$. However, when the newly computed peak value p is determined to be smaller than $T_1$, as shown in FIG. 6, state machine 600 determines that the target object is potentially lost and subsequently transitions to local re-identification state 604.

In some embodiments, once local re-identification state 604 is entered, local re-identification module 250 is triggered which is configured to perform a local re-identification procedure for the target object in the vicinity of a location where the target object was last identified in normal tracking state 602. In some embodiments, the local re-identification procedure compares each newly computed peak value p with another predetermined threshold value $T_2$, which is a value either smaller than or equal to the predetermined threshold $T_1$. As shown in FIG. 6 at state 604, if the newly computed peak value p is less than threshold $T_2$, state machine 600 remains at state 604 and continues to perform the local re-identification procedure. However, if the newly computed peak value p is greater than threshold $T_2$, state machine 600 determines that the target object has been re-identified and subsequently transitions back to normal tracking state 602. This local re-identification procedure is described in more detail below.

In some embodiments, if visual tracking system 200 has stayed in local re-identification state 604 for a certain amount of time after state machine 600 has entered local re-identification state 604, e.g., when measured based on a number of video frames denoted as $F_1$, the target object is assumed to have been lost and state machine 200 subsequently transitions from local re-identification state 604 to global re-identification state 606. In one embodiment, $F_1$ can be determined based on a frame rate and a time allowed for the local re-identification procedure. For example, if the frame rate is 30 FPS, and the time allowed is 4 second, $F_1$ has a value of 120 frames.

In some embodiments, once entering global re-identification state 606, global re-identification module 252 is triggered which is configured to perform a global re-identification procedure by searching for the target object within an entire video frame. In some embodiments, the global re-identification procedure invokes the above and later-described local re-identification procedure multiple times at various locations uniformly distributed within a full video frame. However, due to the high computational complexity, on some low-end platforms, it is not practical to perform this global re-identification procedure for every new video frame. In such systems, the global re-identification procedure may be activated once every few video frames based on a predetermined processing interval $F_2$ (e.g., every 30 frames).

In some embodiments, the disclosed global re-identification procedure compares each newly computed peak value p for a newly-processed frame with another predetermined threshold value $T_3$, which is a value either smaller than or equal to the predetermined threshold $T_2$. As shown in FIG. 6 at state 606, if the newly computed peak value p is greater than threshold $T_3$, state machine 600 determines that the target object has been re-identified by the global re-identification procedure, and subsequently transitions back to normal tracking state 602. However, if the newly computed peak value p is less than or equal to threshold $T_3$, state machine 600 remains in global re-identification state 606 and continues to perform the global re-identification procedure. In some embodiments, if visual tracking system 200 has stayed in global re-identification state 606 for a certain amount of time after state machine 600 has entered global re-identification state 606, e.g., when measured based on a number of video frames denoted as $F_3$, state machine 600 determines that the target object can not be re-identified and is lost, and subsequently transitions from global re-identification state 606 to select-new-target state 608, which then prompts the user to re-select the target for state machine 600. In one embodiment, $F_3$ can be determined based on a frame rate and a time allowed for the global re-identification procedure. For example, if the frame rate is 30 FPS, and the time allowed is 60 second, $F_3$ has a value of 1800 frames.

Target Motion Estimation and Local Re-Identification Procedure

Referring back to FIG. 2, note that visual tracking system 200 can use target motion estimation module 244 to predict the motion of the target object during the disclosed visual object tracking operation. The ability to predict the motion of the target object (also referred to as "target motion estimation" hereinafter) allows the current and future positions of the target object to be predicted. As mentioned above, in the event that object tracking module 204 has lost track of the target object, local re-identification module 250 can take over the visual track operation, and the predicted positions of the target object can be used by local re-identification module 250 to search for the target object near the predicted positions. In some embodiments, target motion estimation module 244 is configured to predict the motion of the target object using a Kalman filter. When the visual tracking operation is performed by object tracking module 204, new positions of the target object continue to be identified. These established positions of the target object can be used to update parameters and train the Kalman filter within target motion estimation module 244. Hence, target motion estimation module 244 can use the trained Kalman filter to predict the motion and positions of the target object, even when such predictions are not required during the visual tracking operation.

More specifically, when the target object is being tracked by object tracking module 204 (i.e., when the state machine is in the tracking state 602), target motion estimation module 244 continues to update the prediction parameters (e.g., Kalman filter parameters). The prediction parameters can include a predicted location of the target object in the next video frame. Generally, the more established locations of the target object are fed to the Kalman filter, the more accurate the predictions become. Note that these predictions do not affect the ROI locations determined by object tracking module 204. However, when the target object is potentially lost in the normal tracking state 200, the predictions made by the Kalman filter can be used to estimate the current positions of the target object to help the re-identification procedures to regain the tracking of the target object.

Note that a Kalman filter technique typically employs a linear model to predict an object motion. Such a linear model can be susceptible to the camera motion, because the combined motion of the object motion and the camera motion is typically non-linear in nature. Hence, when both the target object and the camera are in motion, it can be difficult to use the Kalman filter to represent the motion of the target object. In some embodiments, to improve the accuracy of the Kalman filter prediction, camera motion estimated by camera motion estimation module 242 can be subtracted from the target motion predicted by target motion estimation module 244. The corrected target motion estimation is substantially the result of the target object motion and therefore the estimated positions of the target object by a trained Kalman filter become significantly more reliable.

Figure 7:
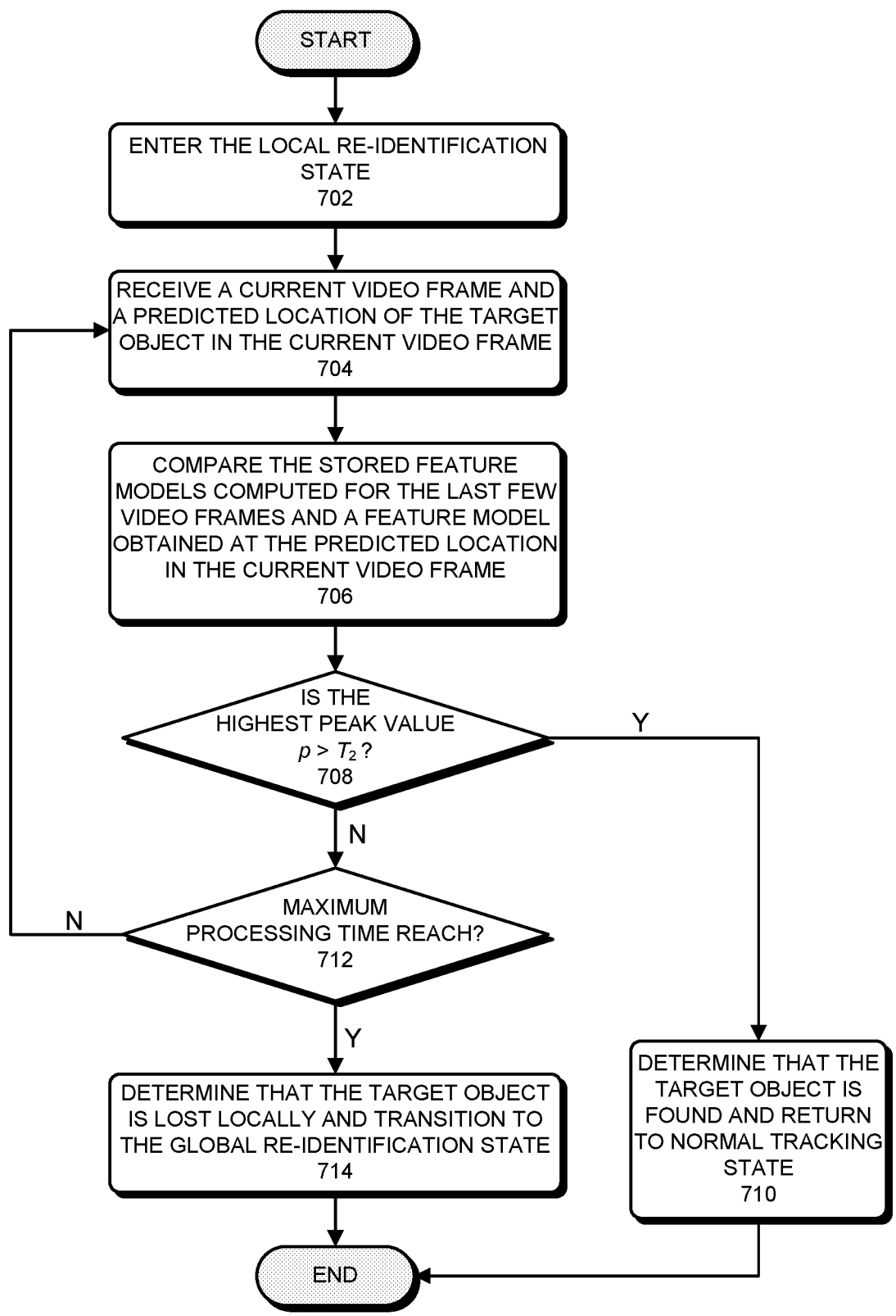
FIG. 7 presents a flowchart illustrating a process for performing a quick local re-identification of the target object during the disclosed visual tracking operation in accordance with some embodiments described herein.

FIG. 7 presents a flowchart illustrating a process for performing a quick local re-identification of the target object during the disclosed visual tracking operation in accordance with some embodiments described herein. Note that the process of FIG. 7 should be understood in the context of system 200 in FIG. 2 and state machine 600 in FIG. 6. As described above, the local re-identification process begins when state machine 600 initially enters local re-identification state 604 (step 702). Next, process receives a current video frame and a predicted location of the target object in the current video frame from target motion estimation module 244 (step 704). It is assumed that at the beginning of local re-identification state 602, the target object is located somewhere close to the position predicted by target motion estimation module 244. Hence, a quick local search at a local area around the predicted target location has a high probability of locating the target object.

Next, the process uses the above-described ROI-feature-based detection technique to compare the stored feature models computed for the last few video frames during normal tracking state 602 and a feature model obtained at the predicted location in the current video frame (step 706). More specifically, the local re-identification process can compute the feature model for the current video frame by first placing a search window in the current video frame centered on the predicted location in the current video frame, and then compute the feature model for the placed search window using the above-described feature-model-generation technique. Moreover, the process can obtain the most-recently-computed feature models associated with the last few video frames from model buffer 236.

In some embodiments, instead of using the few feature models computed for the last few video frames, the process can employ all feature models previously computed and stored in model buffer 236 for the target object to compare with the model feature generated at the predicted location in the current video frame. The intuition for using as many saved feature models as possible is that the appearance (including the size and angle of view) of the target object can change during the transition from normal tracking state 602 to local re-identification state 604. When more feature models associated with the same target object from a greater number of the past video frames are used to compare with the feature model at the predicted location, it becomes more likely to identify the target object in the current video frame which might have changed its appearance. Note that the multiple stored feature models can include the feature models generated at different times during normal tracking process at normal tracking state 602. Moreover, the multiple stored feature models can also include the initial feature model associated with initial frame 222. Note that when comparing feature models in step 706, because multiple feature models associated with multiple previous video frames are used, only a single search window may be needed at the predicted location in the current video frame instead of using multiple search windows of different sizes at the predicted location. However, during the feature model comparisons in step 706, multiple search windows of the same size can be placed at multiple slightly different locations at and near the predicted location and the comparisons can be made between the multiple stored feature models and multiple feature models generated for the multiple search windows of the same size. This approach can be used to mitigate inaccuracy in the predicted location and increase the probability of re-identifying the target object.

Returning to the process of FIG. 7, the process next determines if a sufficiently high peak value in the correlation maps is identified when comparing the stored feature models and the feature model at the predicted location in the current video frame (step 708). As described above in FIG. 6, the process can make the decision based on the comparison with threshold value $T_2$. If so, the target object is locally re-identified and the process can return to normal tracking state 602 (step 710). Otherwise, the process determines if a predetermined processing interval (i.e., maximum time at state 604) has been reached (e.g., if $F_2$ frames have been received and processed) (step 712). If not, the process returns to step 704 to begin processing a new video frame. However, if the target object can not be locally re-identified within the predetermined processing interval, the process determines that the target object is lost locally and subsequently transitions to global re-identification state 606 (step 714), which can be used as a last attempt to re-identify the target object. As described above, global re-identification state 606 searches for the target object within an entire video frame. This includes invoking the above-described local re-identification process, such as the process of FIG. 7, at various locations uniformly distributed within a given video frame. Hence, at each of the various locations, the local operation of global re-identification state 606 can be substantially the same as the overall operation of local re-identification state 604.

Note that the disclosed visual tracking system 200, due to its low-complexity can be implemented on various low-end embedded platforms. For example, visual tracking system 200 can be implemented on a V40 SoC from Allwinner Technology Co., Ltd, which has a quad-core ARM Cortex A7 processor and a Mali 400 MP2 GPU. In some tests, the system can operate at 20 frames per second (FPS) or higher frame rates for 720p video resolution, which is typically sufficient for real-time UAV flight control. Typically, V40 SoC is designed for simple applications such as smart rearview mirrors, digital signages, and POS terminals. The ability to run the disclosed visual tracking system on V40 SoC with satisfactory speed and performance indicates the disclosed visual tracking system can achieve an optimal balance between visual track performance and overall system cost. However, the disclosed visual tracking system and technique can also be used in many other platforms similar to or more powerful than the above V40 SoC.

Figure 8:
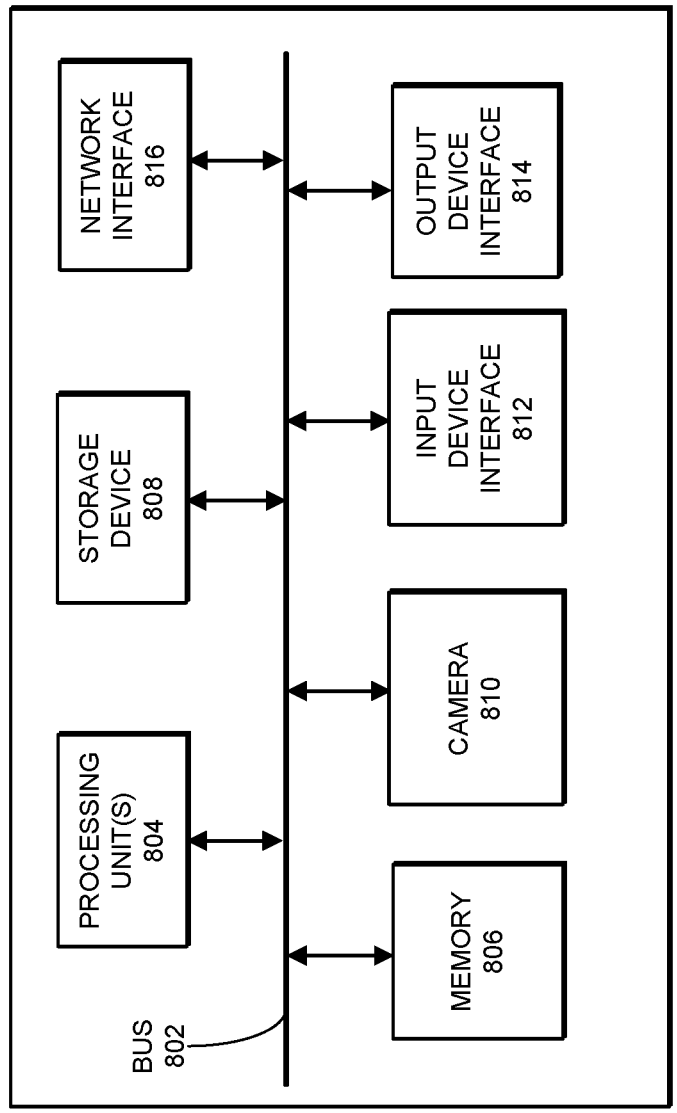
FIG. 8 illustrates an exemplary embedded visual tracking system within which the disclosed visual object tracking system and techniques are implemented in accordance with some embodiments described herein.

FIG. 8 illustrates an exemplary embedded visual tracking system 800 (or "embedded system 800" hereinafter) within which the disclosed visual object tracking system and techniques are implemented in accordance with some embodiments described herein. Embedded system 800 can be integrated with or implemented as a surveillance camera system, a machine vision system, a drone, a robot, or a self-driving car. As can be seen in FIG. 8, embedded system 800 can include a bus 802, processing unit(s) 804, a memory 806, a storage device 808, a camera 810, an input device interface 812, an output device interface 814, and a network interface 816.

Bus 802 collectively represents all system, peripheral, and chipset buses that communicatively couple the various components of embedded system 800. For instance, bus 802 communicatively couples processing unit(s) with memory 806, storage device 808, camera system 810, input device interface 812, output device interface 814, and a network interface 816.

From these various memory units, processing unit(s) 804 retrieves instructions to execute and data to process in order to execute various processes, techniques, and functionalities described in this patent disclosure, including the various embodiments of the disclosed visual object tracking system and techniques described in conjunctions with FIGS. 2-8. In particular, processing unit(s) 804 can be configured to receive real-time video images via bus 802, and perform various disclosed visual tracking operations on the received video images using programs and code stored in memory 806 to perform real-time visual tracking of a target object. Processing unit(s) 804 can include any type of processor, including, but not limited to, a general purpose processor, a graphic processing unit (GPU), a tensor processing unit (TPU), an intelligent processor unit (IPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Furthermore, processing unit(s) 804 can include one or more cores. Processing unit(s) 804 itself can include a cache that stores code and data for execution by processing unit(s). In a low-end UAV implementation of embedded system 800, processing unit(s) 804 includes at least a quad-core ARM Cortex A7 processor and a Mali 400 MP2 GPU.

Memory 806 can include any type of memory that can store code and data for execution by processing unit(s) 804. In particular, memory 806 can store programs and code that implement various processes, techniques, and functionalities described in this patent disclosure, including the various embodiments of the disclosed visual object tracking system and techniques described in conjunctions with FIGS. 2-8. Memory 806 can be configured to receive and buffer captured video frames by camera 810. The type of memory includes but not limited to, dynamic random access memory (DRAM), static random access memory (SRAM), flash memory, read only memory (ROM), and any other type of memory now known or later developed.

Storage device 808 can include any type of non-volatile storage device that can be integrated with embedded system 800. This includes, but is not limited to, magnetic, optical, and magneto-optical storage devices, as well as storage devices based on flash memory and/or battery-backed up memory.

Bus 802 is also coupled to camera 810. Camera 810 is configured to capture still images and/or sequences of video frames at predetermined resolutions and couple the captured image or video data to various components within embedded system 800 via bus 802, such as to memory 806 for buffering and to processing unit(s) 804 for use in visual object tracking. Camera 810 can include one or more digital cameras. In some embodiments, camera 810 includes one or more digital cameras equipped with wide-angle lenses. The captured video frames by camera 810 can have different resolutions including high-resolutions such as at 1280× 720p, 1920×1080p or other lower or higher resolutions.

Bus 802 is also coupled to input device interface 812. Input device interface 812 enables the user to communicate information and select commands to the computer system. Input devices used with input device interface 812 include, for example, a touch-screen display, an alphanumeric keyboard, and a pointing device (also called "cursor control device").

Output device interface 814 which is also coupled to bus 802, enables for example, the display of real-time object track results, such as a target object being tracked and the associated bounding box generated by processing unit(s) 804. Output devices used with output device interface 814 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 8, bus 802 also couples embedded system 800 to a network (not shown) through a network interface 816. In this manner, embedded system 800 can be a part of a network (such as a local area network ("LAN"), a wide area network ("WAN"), or an Intranet, or a network of networks, such as the Internet. Any or all components of embedded system 800 can be used in conjunction with the subject disclosure.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system capable of performing real-time visual tracking of a target object captured in a video by a camera, the system comprising:
    one or more processors:
    a memory coupled to the one or more processors;
    wherein the memory storing instructions that, when executed by the one or more processors, cause the system to:
    receive a first video image of the video and a determined bounding box of the target object in the first video image, wherein the determined bounding box is a rectangular box which specifies a determined first location of the target object and determined dimensions of the target object;
    receive a second video image of the video following the first video image, wherein the location of the target object is unknown in the second video image;
    place a first search window in the first video image centered on the determined first location of the target object, wherein the size of the first search window is greater than the size of the determined bounding box, and separately placing multiple second search windows of multiple window sizes in the second video image, wherein each of the multiple second search windows is centered on a second location in the second video image, wherein the second location corresponds to the determined first location of the target object in the first video image:
    wherein at least one window size in the multiple window sizes is larger than the size of the first search window; and
    wherein at least one window size in the multiple window sizes is smaller than the size of the first search window;
    compute a set of correlation maps between a first image patch of the first video image within the first search window and each of the multiple second image patches of the second video image within the multiple second search windows;
    identify a peak value in each correlation map of the set of the computed correlation maps;
    identify the highest peak value in the set of peak values; and
    determine an updated location of the target object in the second video image based on the location of the identified highest peak value in the second video image, wherein determining the updated location of the target object in the second video image includes:
    comparing the highest peak value with a first threshold value; and
    if the highest peak value is greater than or equal to the first threshold value, choosing the location of the highest peak value as the updated location of the target object in the second video image, and
    if the highest peak value is less than the first threshold value,
    receiving a third video image of the video following the second video image;
    receiving a predicted location of the target object in the third video image from a target motion estimation model, wherein the predicted location is in the vicinity of the determined first location;
    searching for the target object locally based on the predicted location; and
    if the target object is re-identified locally near the predicted location, resuming using the determined first location of the target object in the third video image to track the target object in a subsequent video image in the video.

2. The system of claim 1, wherein the first search window and at least one search window in the multiple second search windows have the same horizontal and vertical dimensions.

3. The system of claim 1, wherein computing the correlation map between the first image patch within the first search window and the second image patch within the second search window includes:
    extracting a first feature map from the first image patch and a second feature map from the second image patch;
    computing a two-dimensional (2D) Fast Fourier Transform (FFT) on the first and second extracted feature maps to generate Fourier representations of the first and second extracted feature maps;
    computing a cross-correlation between the Fourier representations of the first and second extracted feature maps; and
    converting the computed cross-correlation back to the spatial domain to obtain the correlation map.

4. The system of claim 3, wherein computing the cross-correlation between the Fourier representations of the first and second extracted feature maps further comprises:
    computing a first feature model for the first feature map by computing a Gaussian kernel auto-correlation of the Fourier representation of the first extracted feature map;
    computing a second feature model for the second feature map by computing a Gaussian kernel auto-correlation of the Fourier representation of the second extracted feature map; and
    computing the cross-correlation between the Fourier representations of the first and second extracted feature maps by computing element-wise products of the first feature model and the second feature model.

5. The system of claim 3, wherein extracting the first or the second feature map from the first or the second image patch includes:
    extracting a geometry-based feature map from the image patch;
    extracting a color-based feature map from the image patch; and
    concatenating the geometry-based feature map and the color-based feature map to obtain the first or the second feature map.

6. The system of claim 1, wherein prior to receiving the first video image, the method further comprises:
    receiving an earliest video image in a sequence of video frames of the video and a user selected location of the target object within the earliest video image; and
    performing an object detection operation on the earliest video image to generate an initial location and an initial bounding box for the target object in the earliest video image based on the user selected location.

7. The system of claim 1, wherein prior to receiving the predicted location, the method further comprises training the target motion estimation model using a set of previously-determined locations for the target object in the sequence of video frames.

8. The system of claim 1, wherein searching for the target object locally based on the predicted location includes:
  placing a third search window in the third video image centered on the predicted location of the target object;
  extracting a third feature map from a third image patch of the third video image within the third search window;
  retrieving a set of stored feature maps computed at a set of previously-determined locations for the target object associated with a set of previously-processed video images;
  computing a set of correlation maps between the third feature map and each of the set of stored feature maps; and
  attempting to re-identify the target object in the third video image based on the set of computed correlation maps.

9. The system of claim 8, wherein attempting to re-identify the target object in the third video image based on the computed correlation maps includes:
  identifying a peak value in each correlation map of the set of the computed correlation maps;
  identifying the highest peak value in the set of peak values;
  comparing the identified highest peak value with a second threshold value; and
  if the identified highest peak value is greater than the second threshold value, determining that the target object is re-identified in the third video image.

10. The system of claim 1, wherein the target motion estimation model uses a trained Kalman filter to predict a current location of the target object.

11. An unmanned aerial vehicle (UAV) capable of performing real-time visual tracking of a moving object, the UAV comprising:
  one or more processors;
  a memory coupled to the one or more processors;
  a camera mounted on a gimbal and coupled to the one or more processors and the memory, wherein the camera is configured to capture a video of the moving object;
  a visual tracking module configured to:
  receive a first video image of the video and a determined bounding box of the target object in the first video image, wherein the determined bounding box is a rectangular box which specifies a determined first location of the target object and determined dimensions of the target object;
  receive a second video image of the video following the first video image, wherein the location of the target object is unknown in the second video image;
  place a first search window in the first video image centered on the determined first location of the target object, wherein the size of the first search window is greater than the size of the determined bounding box, and separately placing multiple second search windows of multiple window sizes in the second video image, wherein each of the multiple second search windows is centered on a second location in the second video image, wherein the second location corresponds to the determined first location of the target object in the first video image:
  wherein at least one window size in the multiple window sizes is larger than the size of the first search window; and
  wherein at least one window size in the multiple window sizes is smaller than the size of the first search window;
  compute a set of correlation maps between a first image patch of the first video image within the first search window and each of the multiple second image patches of the second video image within the multiple second search windows;
  identify a peak value in each correlation map of the set of the computed correlation maps;
  identify the highest peak value in the set of peak values; and
  determine an updated location of the target object in the second video image based on the location of the identified highest peak value in the second video image, wherein determining the updated location of the target object in the second video image includes:
  comparing the highest peak value with a first threshold value; and
  if the highest peak value is greater than or equal to the first threshold value, choosing the location of the highest peak value as the updated location of the target object in the second video image, and
  if the highest peak value is less than the first threshold value,
  receiving a third video image of the video following the second video image;
  receiving a predicted location of the target object in the third video image from a target motion estimation model, wherein the predicted location is in the vicinity of the determined first location;
  searching for the target object locally based on the predicted location; and
  if the target object is re-identified locally near the predicted location, resuming using the determined first location of the target object in the third video image to track the target object in a subsequent video image in the video.

12. The UAV of claim 11, wherein the visual tracking module is further configured to use the determined updated location of the target object to control the flight of the UAV and/or the gimbal.

* * * * *